US012237630B2

(12) United States Patent
Zucca et al.

(10) Patent No.: US 12,237,630 B2
(45) Date of Patent: Feb. 25, 2025

(54) ELECTRICAL SPLITTER AND ASSEMBLY METHOD

(71) Applicants: TE Connectivity Nederland B.V., s'Hertogenbosch (NL); Tyco Electronics UK Ltd., Swindon (GB)

(72) Inventors: Marco Zucca, s'Hertogenbosch (NL); Subhash Mungarwadi, Swindon (GB); Jonathan Catchpole, Swindon (GB)

(73) Assignees: Tyco Electronics UK Ltd., Swindon (GB); TE Connectivity Nederland B.V., s'Hertogenbosch (NL)

( * ) Notice: Subject to any disclaimer, the term of this patent is extended or adjusted under 35 U.S.C. 154(b) by 0 days.

(21) Appl. No.: 17/205,031

(22) Filed: Mar. 18, 2021

(65) Prior Publication Data

US 2021/0296833 A1 Sep. 23, 2021

(30) Foreign Application Priority Data

Mar. 18, 2020 (EP) .................................... 20164029

(51) Int. Cl.
*H01R 31/02* (2006.01)
*H01R 25/00* (2006.01)

(52) U.S. Cl.
CPC ........... *H01R 31/02* (2013.01); *H01R 25/003* (2013.01)

(58) Field of Classification Search
CPC .... H01R 31/02; H01R 25/003; H01R 13/502; H01R 13/02; H01R 13/40
See application file for complete search history.

(56) References Cited

U.S. PATENT DOCUMENTS

| | | | | |
|---|---|---|---|---|
| 1,950,717 A * | 3/1934 | Douglas | H01R 25/006 439/721 |
| 3,957,337 A * | 5/1976 | Damiano | H01R 13/432 439/748 |
| 4,148,546 A * | 4/1979 | Wilson, Jr. | H02G 3/16 439/724 |
| 5,906,513 A | 5/1999 | Peterson et al. | |
| 7,275,967 B1 * | 10/2007 | Olliff | H01R 31/02 439/654 |
| 7,374,464 B1 | 5/2008 | Vicenza et al. | |
| 8,801,466 B2 | 8/2014 | Wimmer et al. | |
| 9,306,349 B2 * | 4/2016 | Si | H01R 25/003 |
| 2004/0043674 A1 * | 3/2004 | Dunne | H01R 43/16 439/847 |
| 2017/0125926 A1 * | 5/2017 | Yamamoto | H01R 4/72 |
| 2018/0294588 A1 * | 10/2018 | Humphrey | H01R 13/115 |

FOREIGN PATENT DOCUMENTS

CN 110168818 A * 8/2019 ........... H01R 13/424

OTHER PUBLICATIONS

Extended European Search Report, dated Sep. 4, 2020, 9 pages.

* cited by examiner

*Primary Examiner* — Travis S Chambers
(74) *Attorney, Agent, or Firm* — Barley Snyder

(57) ABSTRACT

A splitter for interconnecting a first connector with at least two second connectors includes a first electrically conductive layer that is connectable to the first connector and to at least one of the second connectors. The first layer has at least two electrically conductive terminals which protrude from the first layer. The electrically conductive terminals are arranged to provide electrical connection between a first contact of the first connector and an associated first contact of at least one of the second connectors.

17 Claims, 6 Drawing Sheets

ELECTRICAL SPLITTER AND ASSEMBLY METHOD

CROSS-REFERENCE TO RELATED APPLICATIONS

This application claims priority under 35 U.S.C. § 119 to European Patent Application No. 20164029.9, filed on Mar. 18, 2020.

FIELD OF THE INVENTION

The present disclosure relates to electrical splitters, and more particularly, to an electrical splitter for interconnecting a first connector with at least one second connector.

BACKGROUND

Electrical distribution systems exist for the transmission of electrical signals or also of electrical power from one machine or facility to several other machines or facilities. These distribution systems comprise an electrical distribution device which is designed as a distribution piece, for example, for connection to line and/or connecting devices designed as connectors or lines. For this purpose, the distribution piece is designed as a T-piece or an H-piece, for example. The distribution piece has a conductor track mounted inside the housing and is designed as a rigid or flexible circuit board, for example, for the electrical interconnection of the individual conductive elements of the various connectors. With such an arrangement, a plastic coating can ensure that the distribution piece is sealed against particles and liquids. For the coating process, the circuit board is held in position by a one-piece or multipart housing and/or inner housing. To prevent electrical and magnetic interferences, the distribution piece is provided with an electrically conductive shielding. For instance, conventional splitters are known in which an interconnector includes a current distribution system which is a circuit board.

It is known to use either printed circuit boards (PCBs) or loose wires to bridge the connection with multiple connectors. However, those may be expensive solutions which may require long manual manufacturing time. Additionally, due to the complex manual assembly process, several risks related to over-molding and rejections due to human errors have been observed by the present inventors. Additionally, for high power distribution (e.g. 32 Amps), PCBs for bridging connections may not be preferable since their use may cause high temperature within the product.

Accordingly, there is still a need for an improved splitter requiring a less complex assembly process, with shorter manual manufacturing time and at the same time being robust and economic to manufacture.

SUMMARY

In one embodiment of the present disclosure, a splitter for interconnecting a first connector with at least one second connector is provided. The splitter includes a first electrically conductive layer that is connectable to the first connector and to the at least one second connector. The first layer includes at least two electrically conductive terminals which protrude from the first layer. The electrically conductive terminals are arranged to provide electrical connection between a first contact of the first connector and an associated first contact of the at least one second connector.

BRIEF DESCRIPTION OF THE DRAWINGS

The invention will now be described by way of example with reference to the accompanying Figures, of which.

DETAILED DESCRIPTION OF THE EMBODIMENTS

Figure 1:
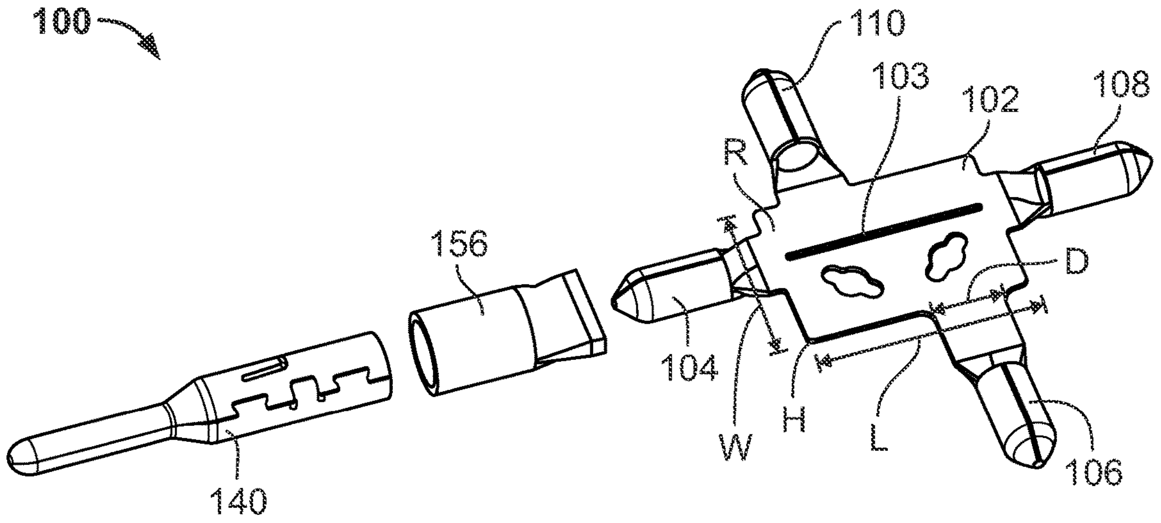
FIG. 1 is a schematic perspective of a splitter assembly according to a first embodiment of the present invention.

Technical solutions of the present disclosure will be described hereinafter in detail through embodiments and with reference to the attached drawings. In the specification, the same or the like reference numerals refer to the same or the like elements. The illustration of the embodiments of the present disclosure made with reference to the attached drawings is aimed to explain the general inventive concept of the present disclosure, not to be construed as a limitation of the present disclosure.

In addition, in the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Referring now to the figures, FIG. 1 is a schematic perspective of a splitter 100 according to a first aspect of the present invention. The splitter 100 has an electrically conductive layer 102 having four electrically conductive terminals 104, 106, 108, 110 protruding from it. FIG. 1 shows that the electrically conductive layer 102 is a solid layer having a rectangular shape R and a height H. The rectangular shape has a long edge L or in other worlds length L and short edge W or in other words width W. The length L and the width W of the rectangular shape are large in relation to the height H of the electrically conductive layer or in other words the electrically conductive layer is a thin layer. Two of the four electrically conductive terminals protrude perpendicularly from the long edges L of the rectangular shape and another two electrically conductive terminals protrude perpendicularly from the short edge W of the rectangular shape. In other words, the electrically conductive terminals are arranged on a plane substantially parallel to the electrically conductive layer. The expression "substantially parallel to the electrically conductive layer" means that the electrically conductive terminals are arranged on a plane that is substantially parallel to the rectangular shape or in other words rectangular outline of the electrically conductive layer.

The electrically conductive layer may have a different shape. For example, the electrically conductive layer may be a solid layer such as a thin metal layer having a circular shape and a thin height, in which case the electrically conductive terminals may protrude radially from the circular shape separated an angular distance from each other. The number of electrically conductive terminals and the angle between them may depend on the number of connectors to interconnect and on which directions the connectors are to be interconnected. For example, when the splitter is designed to split current in three directions, the electrically conductive terminals may protrude radially from the circular shape separated 120 degrees from each other. When the splitter is designed to split current in four directions the electrically conductive terminals may protrude radially from the circular shape separated 90 degrees from each other.

The term "solid" refers to a body or a geometric figure having three dimensions. The mechanics of a solid layer, or in order words of a solid body, relates to the behavior of a material, like its deformation under the action of forces, temperature changes and other external or internal agents.

The electrically conductive layer may also have a polygonal shape, in which case the electrically conductive terminals protrude from the edges of the polygonal shape.

FIG. 1 shows the width D of the protrusion from which the electrically conductive terminals protrude from the electrically conductive layer. The width D of the protrusion may be as large as the edge of the electrically conductive layer from which the electrically conductive terminal protrudes. A large width D results in a lower resistance, therefore reducing the amount of power lost to heat and avoiding high temperatures within the products.

FIG. 1 shows that the electrically conductive layer 102 may have an emboss 103 placed parallel to the long edges L of the rectangular shape R so as to improve the rigidity of the electrically conductive layer 102. The term "emboss" refers to a change in the shape of the electric conductive layer from flat to shaped, so that some areas are lowered relative to other areas. In other words, a groove, fold or notch is formed in the otherwise planar layer.

The emboss 103 is arranged parallel to the long edges L of the rectangular shape increases the second moment of area of the electrically conductive layer 102 especially with respect to an axis perpendicular to the emboss i.e. an axis that cuts the two long edges L of the rectangular shape. Therefore, such an emboss 103 provides the electrically conductive layer 102 with improved stiffness in relation to an axis perpendicular to the emboss (and contained in the layer) so that the electrically conductive layer is more difficult to bend in relation to such axis i.e. the emboss provides the electrically conductive layer with higher resistance per degree change in its angle when twisted due to forces exerted by the connectors connected to the terminals of the layers. The use of the emboss 103 or of a plurality of embosses is particularly important when the electrically conductive layers are thin.

The emboss 103 may also provide the electrically conductive layers 102 with increased resiliency. Resiliency may be defined as the maximum energy per unit volume that can be absorbed by a body (electrically conductive layers) up to the elastic limit, without creating a permanent distortion i.e. before plastic deformation occurs. The energy absorbed by the electrically conductive layer 102 due to forces exerted by the connectors causing rotation of the electrically conductive layer may be defined as the mechanical work applied during rotation. The mechanical work applied during rotation is the torque applied to the electrically conductive layer for example by twisting the connectors connected to the electrically conductive terminals times the rotation angle. Given that the torque in relation to an axis depends on the second moment of area of the body in the relation to that axis, the emboss 103 of this invention, by providing the electrically conductive layer 102 with a higher second moment of area with relation to an axis causes a higher torque to be necessary to rotate the layers and thus, the emboss 103 improves the resiliency of the layers 102.

Resiliency is highly dependent on temperature i.e. resiliency decreases at high temperatures. The enhanced resiliency of the electrically conductive layers provided by the emboss is particularly relevant at high temperatures, for example when the electrically conductive layers are used for high power distribution which may cause high temperatures in the electrically conductive layers.

FIG. 1 shows an elongated emboss 103, however the electrically conductive layer 102 may have several emboss (es) arranged in different locations of the electrically conductive layers depending on the directions of torques exerted by the connectors that the electrically conductive layer has to resist before bending. For example, for electrically conductive layers having circular shape multiple embosses may be provided radially which improves the stiffness of the electrically conductive layer in relation to axes perpendicular to the radial embosses.

FIG. 1 further shows that the contacts 111, 113, 115 of the connectors 112, 114, 116, 118 (see FIG. 4, for example) may be formed as a separate element 140 having a body fixed to one of the electrically conductive terminals 104 associated to that contact. Optionally, the contact 140 of the connectors is fixed to the electrically conductive terminals by a press fit. It also shows an electrically insulating tube 156 that may be arranged around the contacts and the terminals. The electrically insulating tube may be a heat shrink tube 156.

Figure 2:
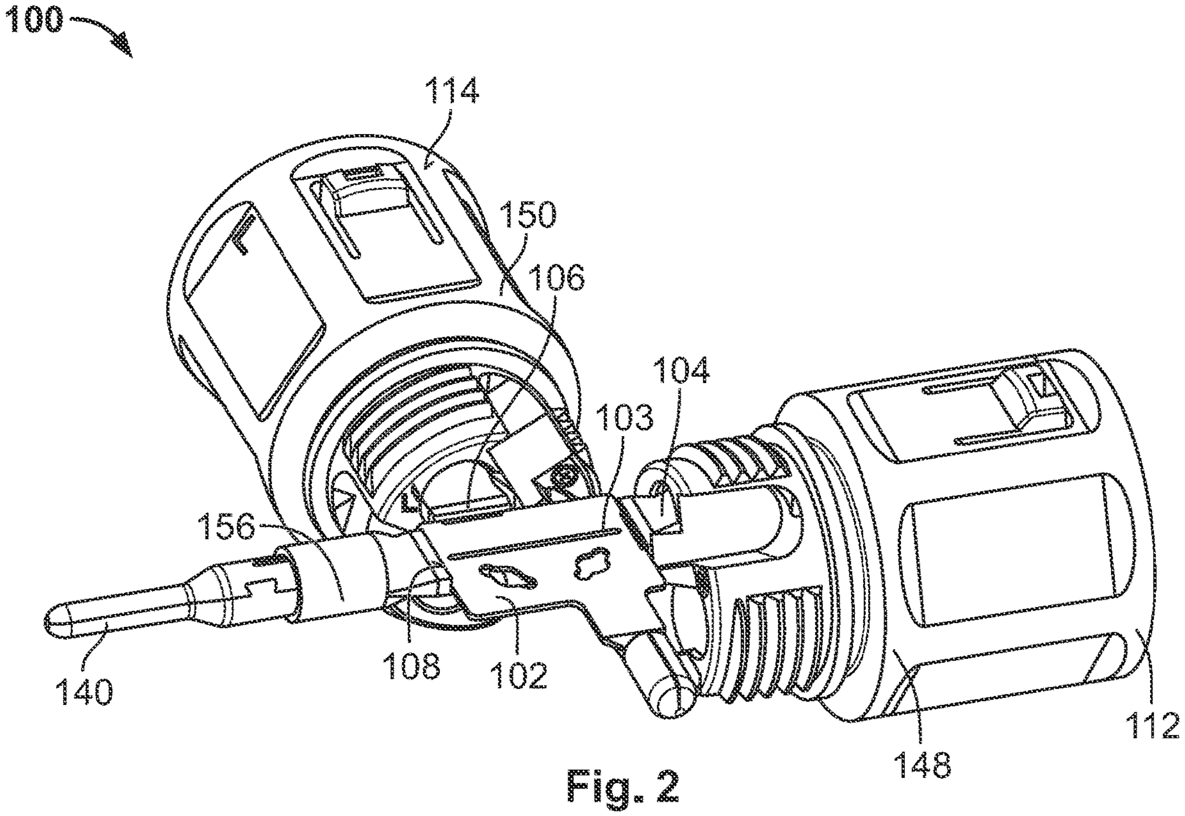
FIG. 2 is a schematic perspective of a detail of the splitter of FIG. 1.

FIG. 2 shows the splitter of FIG. 1 interconnecting a first connector 112 with a second connector 114 forming 90 degrees with the first connector. The first electrically conductive layer 102 of a rectangular shape having four terminals 104, 106, 108, 110 protruding from each of the four edges of the rectangular electrically conductive layer. Electrically conductive terminals 104, 106 of the first electrically conductive layer 102 provide electrical connection between a first contact 111 of the first connector 112, a first contact 111 of one of the second connectors 114 (see FIG. 4, for example).

FIG. 2 further shows contact housings 148, 150 encompassing contacts of the first and second connectors 112, 114 for electrically insulating the connectors. FIG. 2 shows an electrically conductive terminal 108 connected to contact 140 of a third connector without showing a contact housing of the connector.

Figure 3:
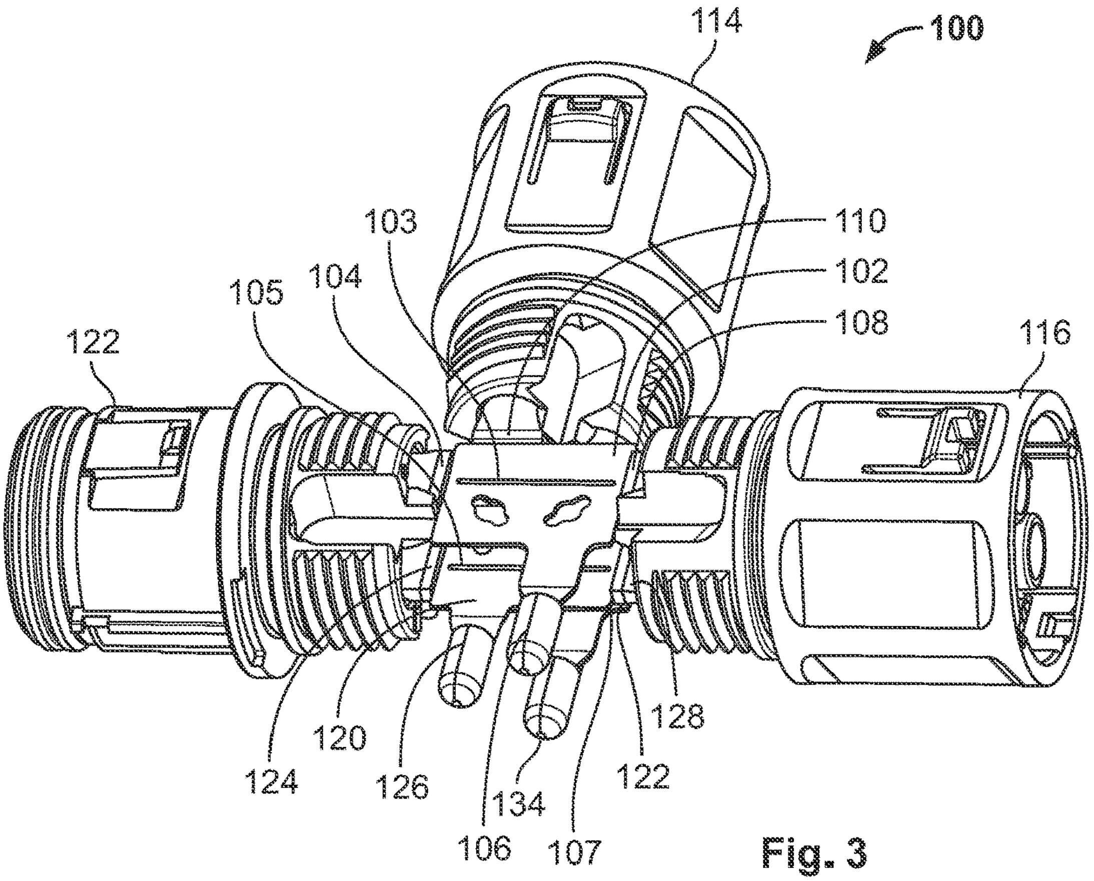
FIG. 3 is a schematic perspective of a splitter of a further embodiment of the present invention.

FIG. 3 shows a splitter 100 according to an embodiment of the present invention. The splitter 100 interconnects the first connector 112 with two of the second connectors 114, 116. The first electrically conductive layer 102 has four electrically conductive terminals 104, 106, 108, 110 which protrude from the first electrically conductive layer 102, three of the four electrically conductive terminals 104, 106, 108 provide electrical connection between a first contact 111 of the first connector 112 and an associated first contact 111 of each of the two second connectors 114, 116. A second electrically conductive layer 120 comprises four electrically conductive terminals 124, 126, 128, 130, three of the four electrically conductive terminals 124, 126, 128 provide electrical connection between a second contact 113 of the first connector and an associated second contact 113 of each of the two second connectors 114, 116, 118. The second electrically conductive layer 120 is placed at a distance from the first electrically conductive layer. The third electrically conductive layer 122 comprising four electrically conductive terminals including terminals 134, 138, three of which provide electrical connection between a third contact 115 of the first connector and an associated third contact 115 of each of the two second connectors 114, 116. The third electrically conductive layer 122 is placed at a distance from the second electrically conductive layer 120.

The remaining electrically conductive terminal 110 of the first electrically conductive layer 102 and/or the remaining electrically conductive terminal 130 of the second electrically conductive layer 120 and/or the remaining electrically conductive terminal 138 of the third electrically conductive layer 122 may be used to provide electrical connection with an associated first, second and a third contact respectively of a fourth second connector.

The expression "placed at a distance" refers to being placed essentially in parallel to each other. Placed at distance preferably means that the shapes of the electrically conductive layers are placed parallel to each other. However, the emboss of each electrically conductive layer may not be placed parallel to the emboss of another electrically conductive layer.

In this way, FIG. 3 shows that the first connector 112 has three contacts 111, 113, 115 of the first connector, one of the second connectors (second connector) has three contacts 111, 113, 115 and the other second connector (third connector) 116 has three contacts 111, 113, 115. Electrically conductive terminals 104, 106 108 of the first electrically conductive layer 102 provide electrical connection between a first contact 111 of the first connector 112, a first contact 111 of the one of the second connectors (second connector) 114 and a first contact 111 of the other second connector (third connector) 116. Electrically conductive terminals 124, 126, 128 of the second layer 120 provide electrical connection between a second contact 113 of the first connector 112, a second contact 113 of the one of the second connectors (second connector) 114 and a second contact of the other second connector (third connector) 116.

FIG. 3 further shows that the three electrically conductive layers 102 have a rectangular shape. The first conductive layer 102 has an emboss 103 to increase the stiffness of the first electrically conductive layer, the second electrically conductive layer 120 has an emboss 105 to increase the stiffness of the second electrically conductive layer, the third electrically conductive layer 122 has an emboss 107 to increase the stiffness of the third electrically conductive layer.

When the expression "placed at a distance" refers to placed parallel to each other, the emboss of each electrically conductive layer may not be placed parallel to the emboss of another electrically conductive layer.

FIG. 3 shows contact housings 148, 150, 152 encompassing contacts of the first, second and third connectors for electrically insulating the connectors.

Figure 4:
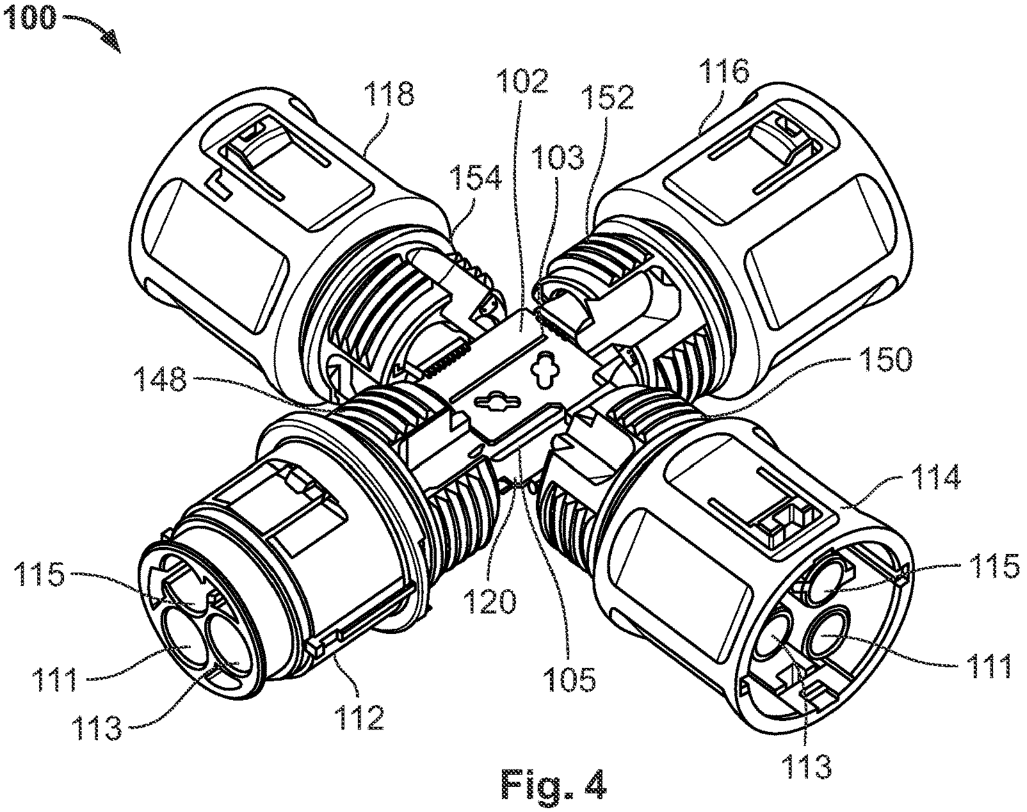
FIG. 4 is a schematic perspective of a splitter of a further embodiment of the present invention.

FIG. 4 is a schematic perspective representation of a splitter according to an embodiment of the present invention for interconnecting the first connector 112 with three of the second connectors 114, 116, 118. The first electrically conductive layer 102 has four of the electrically conductive terminals 104, 106, 108, 110 which protrude from the first layer 102, the electrically conductive terminals 104, 106, 108, 110 provide electrical connection between the first contact 111 of the first connector 112 and an associated first contact 111 of each of the three second connectors 114. The second electrically conductive layer 120 comprises four of the electrically conductive terminals 124, 126, 128, 130 providing electrical connection between a second contact 113 of the first connector and an associated second contact 113 of each of the three second connectors 112, 114, 116, 118. The third electric conductive layer 122 comprises four of the electrically conductive terminals including terminals 134, 138 that provide electrical connection between a third contact 115 of the first connector and an associated third contact 115 each of three second connectors 112, 114, 116, 118.

FIG. 4 shows that at least two of the three electrically conductive layers are provided with an emboss.

Figure 5:
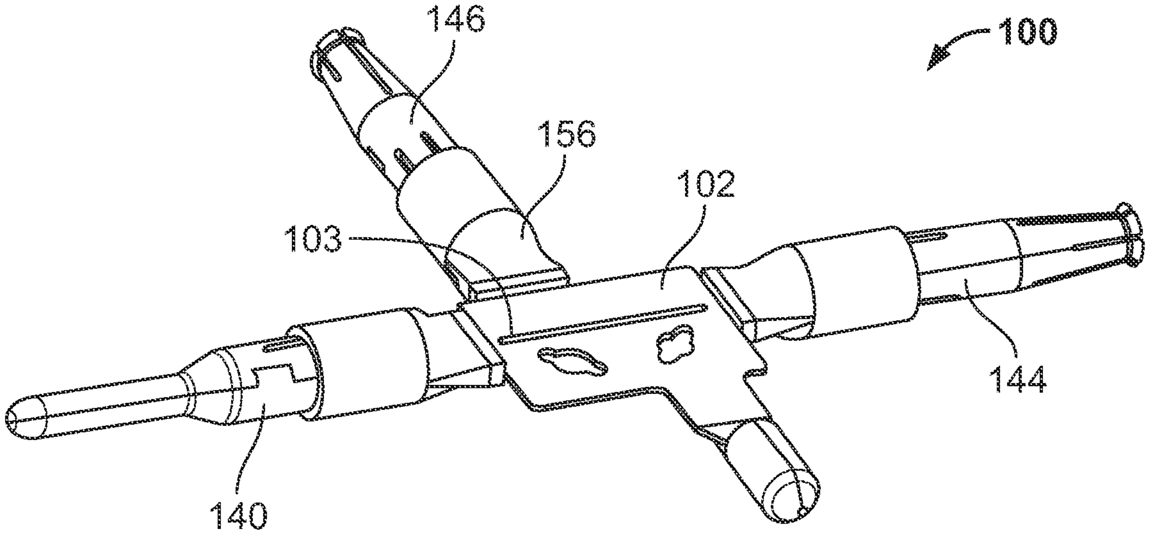
FIG. 5 is a schematic perspective of a detail of the a splitter of the present invention.

FIG. 5 shows a perspective of a splitter according to an embodiment of the present invention where contacts of three connectors are shown as elements 140, 144, 146 separated from the connectors. Contacts 140, 144, 146 have the body fixed to three of the four electrically conductive terminals 104, 108, 110 of an electrically conductive layer. An electrically insulating tube 156 is arranged around the three contacts 140, 144, 146 of the connectors and the electrically conductive terminals. This arrangement avoids rubber or thermoplastic from getting in contact with the connectors during over-molding. The electrically insulating tube can be a heat shrink tube.

Figure 6:
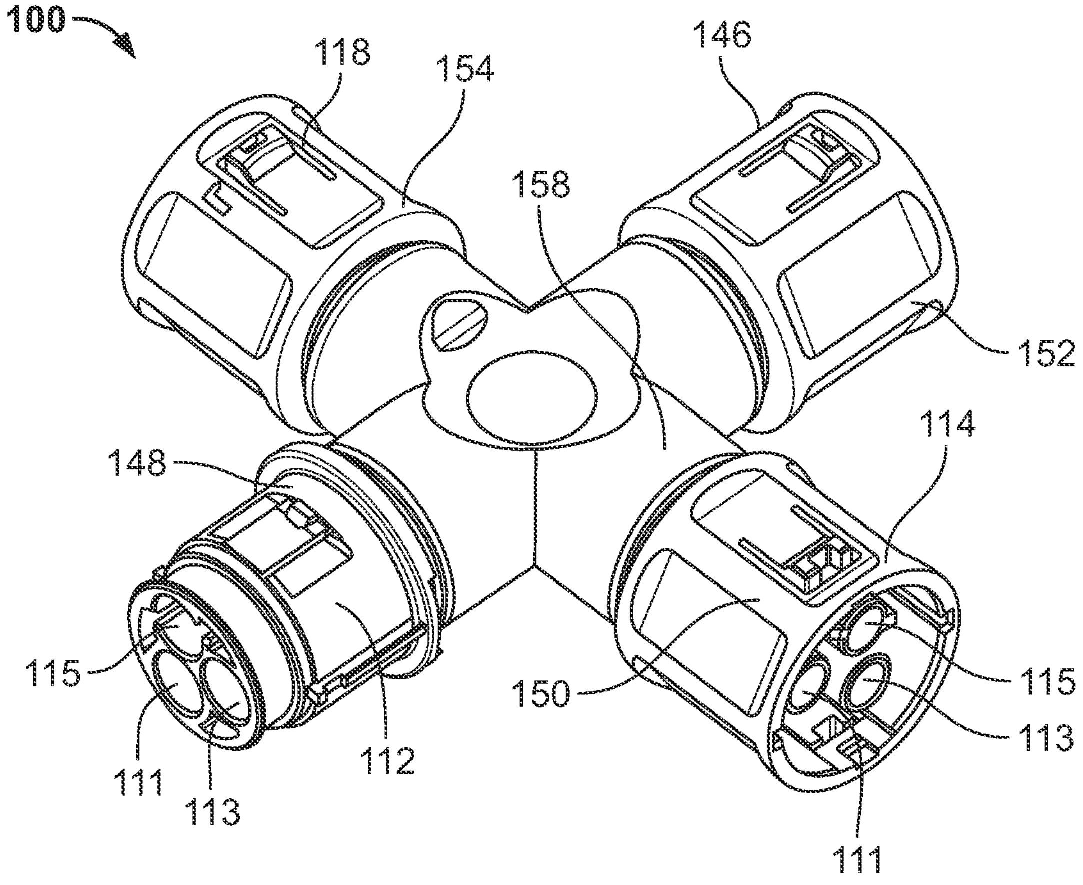
FIG. 6 is a schematic perspective of a detail of the splitter of FIG. 4.

FIG. 6 shows a splitter according to a further embodiment having an inner molded housing 158 which provides mechanical protection and elasticity. In particular, when being operated under elevated temperatures this elasticity avoids breaking of the housing when the metallic layers expand.

Figure 7:
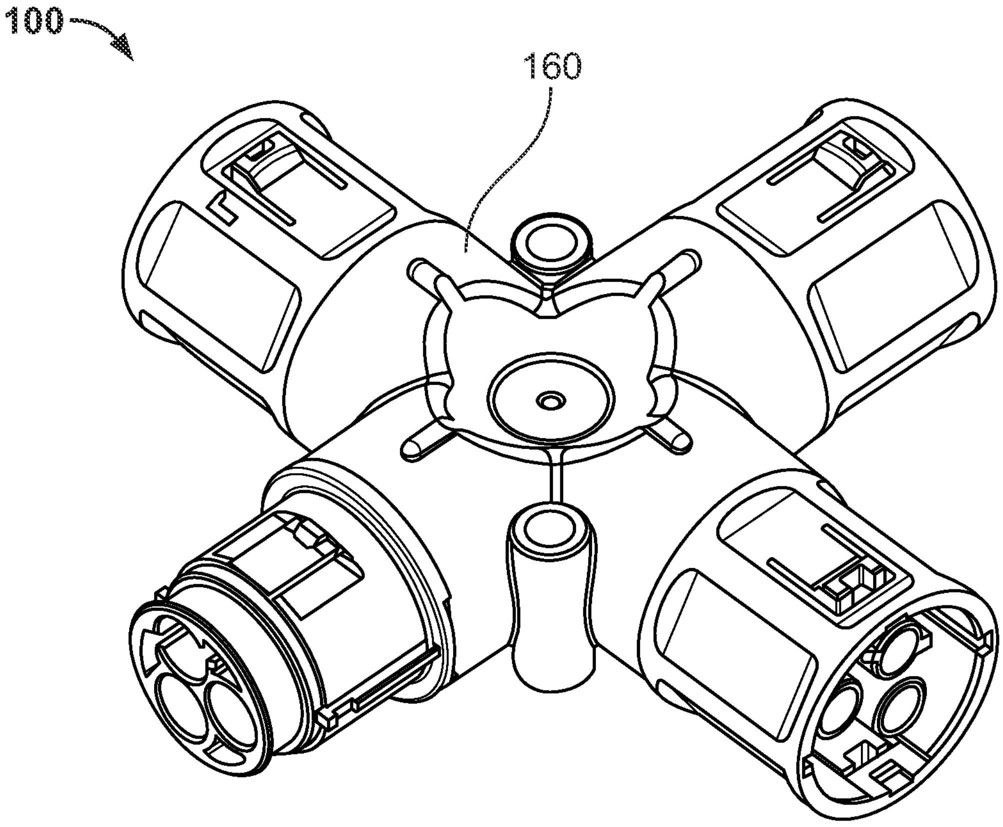
FIG. 7 is schematic perspective of a detail of the splitter of FIG. 4 and FIG. 6.

FIG. 7 shows a splitter according to a further embodiment having an inner molding housing 158 and an outer molding housing 160 which hermetically encloses the splitter.

Figure 8:
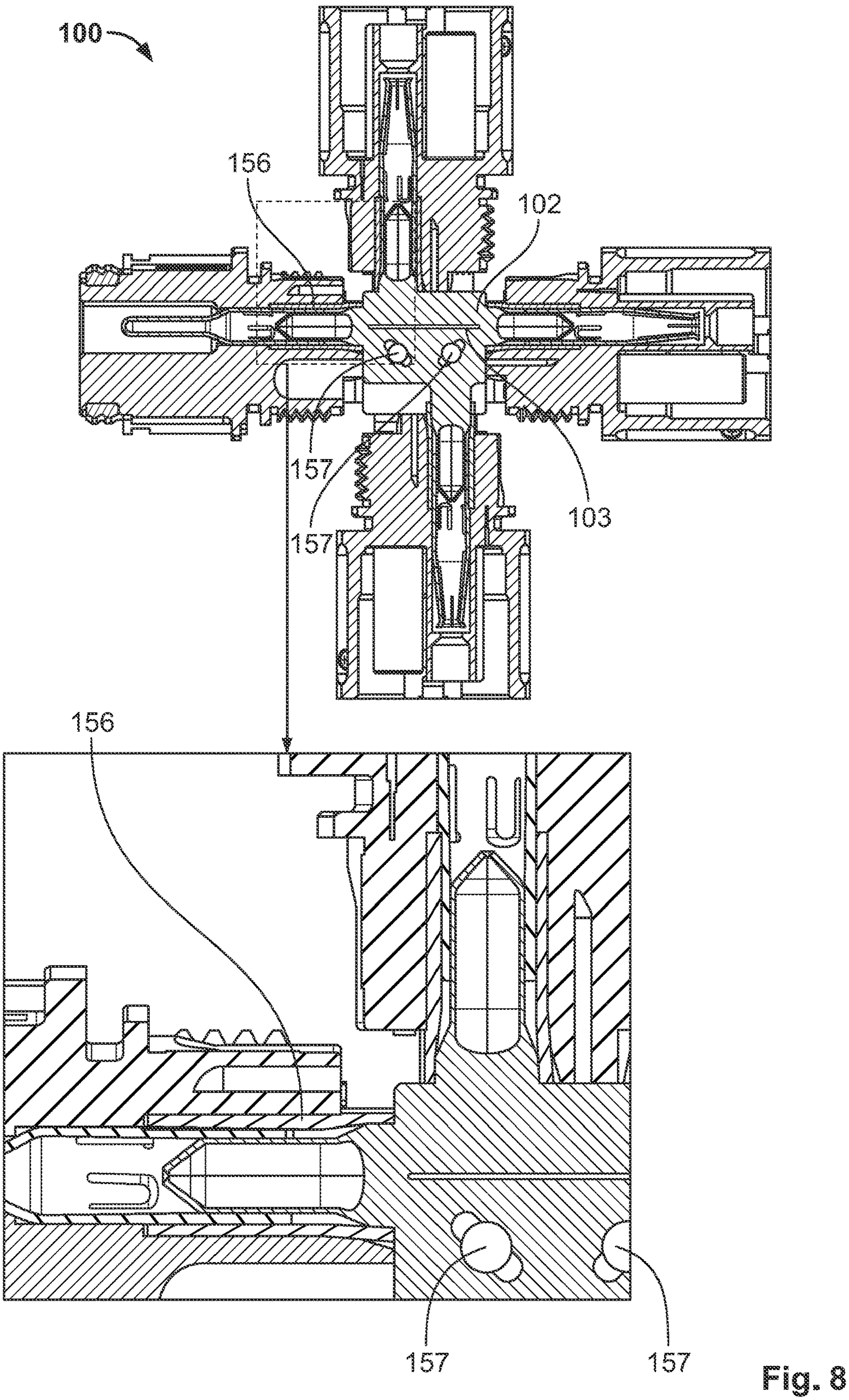
FIG. 8 is a cross sectional view of the splitter FIG. 4.

FIG. 8 is a cross sectional view of the splitter of FIG. 4. FIG. 8 shows an electrically conductive layer 102 of rectangular shape with four electrically conductive terminals protruding. FIG. 8 shows first contacts 111 of the first, second and fourth connectors 112, 114, 116, 118 connected to the four electrically conductive terminals 104, 106, 108, 110. It shows a detail of an electrically insulating tube 156 arranged to as to enclose a terminal and a contact so as to avoid that material may get in contact with the terminals and with the connectors during over-molding. The electrically insulating tube optionally is a heat shrink tube.

FIG. 8 shows that electrically conductive layer 102 may optionally have means of aligning 157 to facilitate aligning of the electric conductive layers during the over-molding process. When more than one electrically conductive layer 102, 120, 122 is used, at least one, or in other words one or several, of the electrically conductive layers may optionally be provided with means of aligning 157.

Figure 9:
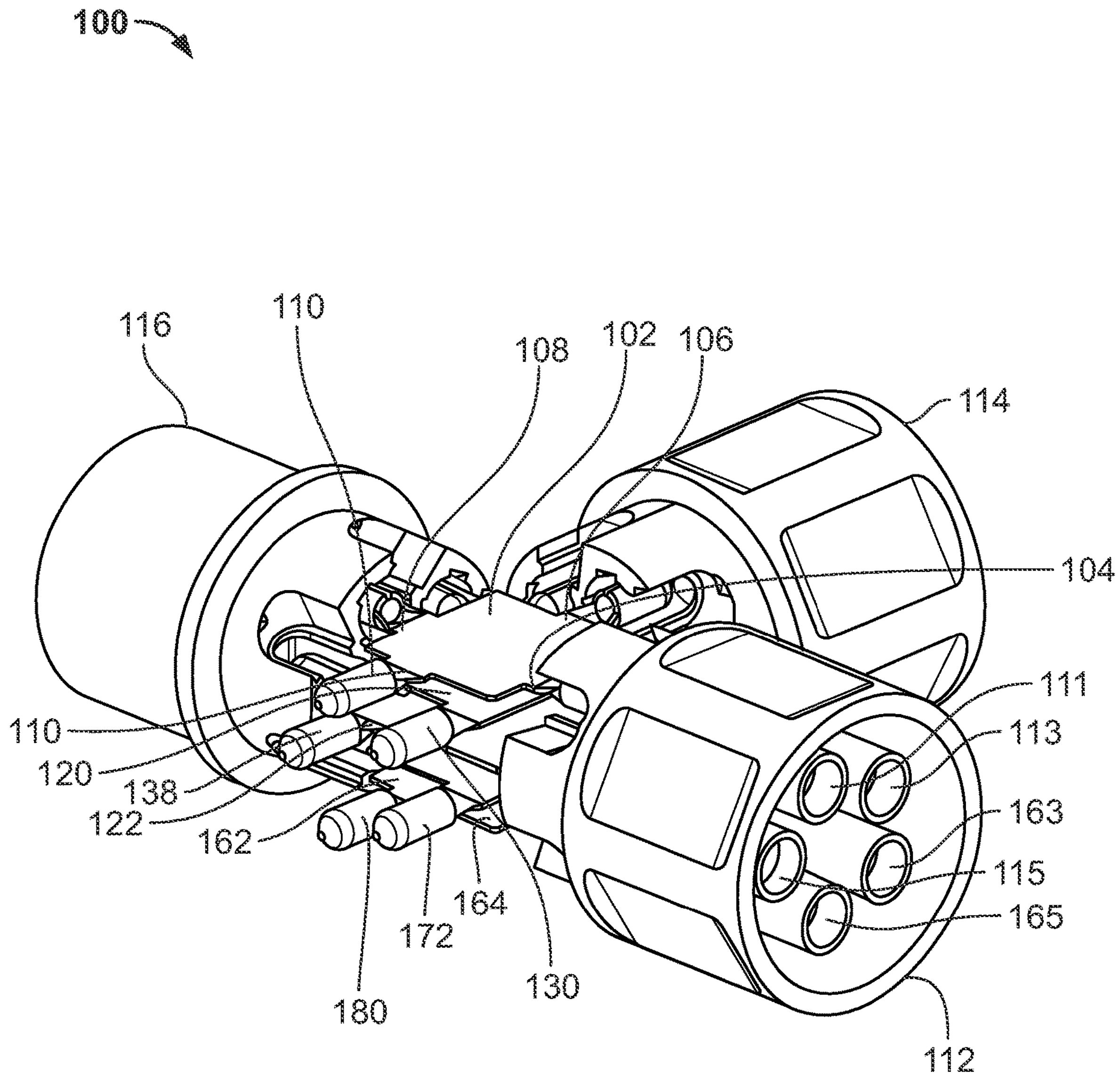
FIG. 9 is a schematic perspective of a splitter of a further embodiment of the present invention.

FIG. 9 is a schematic perspective representation of a splitter of a further embodiment of the present invention for interconnecting the first connector 112 with two (or three) of the second connectors 114, 116. A first electrically conductive layer 102 has four of the electrically conductive terminals 104, 106, 108, 110 which protrude from the first layer 102, the electrically conductive terminals 104, 106, 108, 110 provide electrical connection between the first contact 111 of the first connector 112 and an associated first contact 111 of each of two second connectors 114, 116. A second electrically conductive layer 120 comprises four electrically conductive terminals providing electrical connection between a second contact 113 of the first connector 112 and an associated second contact 113 of each of two second connectors 114, 116. A third electric conductive layer 122 comprises four of the electrically conductive terminals including terminal 138 that provide electrical connection between a third contact 115 of the first connector 112 and an associated third contact 115 each of two second connectors 114, 116. A fourth electrically conductive layer 162 comprises four of the electrically conductive terminals that provide electrical connection between a fourth contact 163 of the first connector 112 and an associated fourth contact 163 of each of two second connectors 114, 116. A fifth electrically conductive layer 164 comprises four of the electrically conductive terminals including terminal 180 providing electrical connection between a fifth contact 165 of the first connector 112 and an associated fifth contact 165 of each of two second connectors 114, 116.

Electrically conductive terminals 110, 130, 138, 172, 180 of the first, second, third, fourth and fifth electrically conductive layers shown in the FIG. 9 as not providing electrical connection with a fourth second connector can be used to provide electrical connection with an associated first, second, third, fourth and fifth contact respectively of a fourth second connector.

FIG. 9 shows that some of the electrically conductive layers are provided with an emboss and that the emboss(es) may or may not be aligned with each other.

It should be appreciated by those skilled in this art that the above embodiments are intended to be illustrative, and many modifications may be made to the above embodiments by those skilled in this art, and various structures described in various embodiments may be freely combined with each other without conflicting in configuration or principle.

Although the present disclosure have been described hereinbefore in detail with reference to the attached drawings, it should be appreciated that the disclosed embodiments in the attached drawings are intended to illustrate the preferred embodiments of the present disclosure by way of example, and should not be construed as limitation to the present disclosure.

Although several exemplary embodiments have been shown and described, it would be appreciated by those skilled in the art that various changes or modifications may be made to these embodiments without departing from the principles and spirit of the invention, the scope of which is defined by the claims and their equivalents.

It should be noted that, the word "comprise" doesn't exclude other elements or steps, and the word "a" or "an" doesn't exclude more than one. In addition, any reference numerals in the claims should not be interpreted as the limitation to the scope of the present disclosure.

What is claimed is:

1. A splitter for interconnecting a first connector with at least one second connector comprising:

a first electrically conductive layer that is connectable to the first connector and to the at least one second connector, the first layer having at least two electrically conductive terminals which protrude from the first layer, the electrically conductive terminals being arranged to provide electrical connection between a first contact of the first connector and an associated first contact of the at least one second connector, the first electrically conductive layer has an emboss spaced apart from the electrically conductive terminals and extending parallel to a pair of long edges of the first electrically conductive layer, the electrically conductive terminals extend from opposite long edges and are offset from one another in a length direction extending along the long edges, each of the first contact of the first connector and the second contact of the second connector is formed as a separate contact element having a body fixed to one of the electrically conductive terminals associated with that contact, the one of the electrically conductive terminals is press fit into the body, an electrically insulating tube is arranged around at least one of the first contact and the second contact fixed to one of the electrically conductive terminals.

2. The splitter according to claim 1, wherein the first electrically conductive layer is a solid layer made of an electrically conductive material.

3. The splitter according to claim 2, wherein the electrically conductive layer has a rectangular shape having a length and a width, the electrically conductive layer having a height perpendicular to the rectangular shape.

4. The splitter according to claim 3, wherein the electrically conductive terminals protrude from the electrically conductive layer in a direction parallel to the rectangular shape.

5. The splitter according to claim 4, further comprising at least one second electrically conductive layer arranged at a distance from the first electrically conductive layer.

6. The splitter according to claim 5, wherein each of the at least one second electrically conductive layers include at least two electrically conductive terminals which protrude from the second electrically conductive layer.

7. The splitter according to claim 6, wherein the electrically conductive terminals are arranged to provide electrical connection between a second contact of the first connector and an associated second contact of at least one of the second connectors.

8. The splitter according to claim 1, further comprising at least a contact housing encompassing one of the connectors for electrically insulating the connector.

9. The splitter according to claim 8, further comprising a splitter housing for electrically insulating the splitter.

10. The splitter according to claim 9, wherein the splitter housing includes an inner housing and an outer housing.

11. A method of assembling a splitter for interconnecting a first connector with at least one second connector, the method comprising the steps of:

connecting a first electrically conductive layer to the first connector and to at least one of the second connectors, the first layer having at least two electrically conductive terminals which protrude from the first layer, the first electrically conductive layer has an emboss spaced apart from the electrically conductive terminals and extending parallel to a pair of long edges of the first electrically conductive layer, the electrically conductive terminals extend from opposite long edges and are offset from one another in a length direction extending along the long edges;

providing by the terminals electrical connection between a first contact of the first connector and an associated first contact of at least one of the second connectors, each of the first contact of the first connector and the associated first contact of the second connector is formed as a separate contact element having a body fixed to one of the electrically conductive terminals associated with that contact, the one of the electrically conductive terminals is press fit into the body; and arranging an electrically insulating tube around at least one of the first contact and the associated first contact fixed to one of the electrically conductive terminals.

12. The method according to claim 11, further comprising the step of arranging at least one second electrically conductive layer at a distance from the first electrically conductive layer.

13. The method according to claim 12, wherein each of the at least one second electrically conductive layers include at least two electrically conductive terminals which protrude from the second electrically conductive layer, the electrically conductive terminals arranged to provide electrical connection between a second contact of the first connector and an associated second contact of at least one of the second connectors.

14. A splitter for interconnecting a first connector having a separate contact element with a second connector having a separate contact element, each of the contact elements of the connectors having a body fixed to one of a plurality of electrically conductive terminals associated with that contact, the splitter comprising:

a first electrically conductive layer:

(a) made of an electrically conductive material and connectable to the first connector and to the second connector, (b) having a rectangular shape having a length and a width and a height perpendicular to the rectangular shape, and, (c) having two electrically conductive terminals that:

(1) protrude from the first electrically conductive layer in a direction parallel to the rectangular shape, (2) provide electrical connection between a first contact of the first connector and an associated first contact of the second connector; and (3) are arranged to provide electrical connection between a second contact of the first connector and an associated second contact of the second connector by a press fit;

a second electrically conductive layer arranged at a distance from the first electrically conductive layer and having at least two electrically conductive terminals which protrude from the second electrically conductive layer;

a contact housing encompassing one of the connectors for electrically insulating the connector;

a splitter housing for electrically insulating the splitter and having an inner housing and an outer housing; and an electrically insulating tube arranged around one of the contacts of the connectors and/or the electrically conductive terminals.

15. The splitter according to claim 14, wherein the electrically conductive layer has a rectangular shape provided with at least one emboss along one of the long edges of the rectangular shape.

16. The splitter according to claim 14, wherein the electrical conductive layer has a polygonal shape provided with at least one emboss or a circular shape provided with at least one emboss.

17. A method of assembling a splitter for interconnecting a first connector with a second connector, the method comprising the steps of:

connecting a first electrically conductive layer to the first connector and to the second connector, the first layer having an emboss and two electrically conductive terminals which protrude from the first layer, the first layer has a pair of long edges parallel to one another, the electrically conductive terminals extend from opposite long edges and are offset from one another in a length direction extending along the long edges;

providing by the terminals electrical connection between a first contact of the first connector and an associated first contact of the second connector;

arranging a second electrically conductive layer at a distance from the first electrically conductive layer with the second electrically conductive layer having an emboss and two electrically conductive terminals which protrude from the second electrically conductive layer, the electrically conductive terminals arranged to provide electrical connection between a second contact of the first connector and an associated second contact of the second connector, the emboss of the first layer and the emboss of the second layer are not parallel to one another;

forming each of the contacts of the connectors as a separate contact element and fixing the contacts of the connectors to one of the electrically conductive terminals associated with that contact, the one of the electrically conductive terminals is press fit into the contact; and attaching an electrically insulating tube around at least one of the contacts of the connectors and/or around at least one of the electrically conductive terminals of the electrically conductive layers.

* * * * *